(12) United States Patent
Bruckman et al.

(10) Patent No.: US 8,958,514 B2
(45) Date of Patent: Feb. 17, 2015

(54) CLOCK RECOVERY IN COMMUNICATION OF HIERARCHICALLY ENCAPSULATED SIGNALS

(71) Applicant: Iplight Ltd., Petach Tikva (IL)

(72) Inventors: Leon Bruckman, Petah-Tikva (IL); Zeev Maister, Kefar Hogla (IL)

(73) Assignee: Iplight Ltd., Petach Tikva (IL)

( * ) Notice: Subject to any disclaimer, the term of this patent is extended or adjusted under 35 U.S.C. 154(b) by 27 days.

(21) Appl. No.: 13/940,278

(22) Filed: Jul. 12, 2013

(65) Prior Publication Data

US 2015/0016578 A1 Jan. 15, 2015

(51) Int. Cl.
*H04L 7/00* (2006.01)
*H04L 7/027* (2006.01)

(52) U.S. Cl.
CPC .................................. *H04L 7/027* (2013.01)
USPC ............................ 375/356; 375/354; 375/327

(58) Field of Classification Search
CPC .............................. H04J 3/1652; H04J 3/1658
See application file for complete search history.

(56) References Cited

U.S. PATENT DOCUMENTS

| | | | |
|---|---|---|---|
| 6,892,032 B2* | 5/2005 | Milton et al. | 398/79 |
| 2004/0105456 A1* | 6/2004 | Lanzone et al. | 370/429 |
| 2007/0116061 A1* | 5/2007 | Meagher et al. | 370/503 |
| 2008/0031393 A1* | 2/2008 | Tsurumi et al. | 375/362 |
| 2009/0074410 A1* | 3/2009 | Zou et al. | 398/52 |

OTHER PUBLICATIONS

ITU-T Recommendation 15 G.709/Y.1331, "Interfaces for the Optical Transport Network (OTN)", 238 pages, Feb. 2012.

* cited by examiner

*Primary Examiner* — Shuwang Liu
*Assistant Examiner* — Ross Varndell
(74) *Attorney, Agent, or Firm* — D Kliger I.P. Services Ltd.

(57) ABSTRACT

An apparatus includes a data flow circuit and a clock recovery circuit. The data flow circuit is configured to extract client data, which is encapsulated in an inner frame that is encapsulated in at least an outer frame, and to output the extracted client data in accordance with a client clock signal. The clock recovery circuit includes a first clock recovery module that is configured to recover a first clock signal that matches payload data in the outer frame, and a second clock recovery module that is configured to derive from the first clock signal a second clock signal that matches the client data in the inner frame, and to produce the client clock signal from the second clock signal, for use by the data flow circuit.

11 Claims, 5 Drawing Sheets

CLOCK RECOVERY IN COMMUNICATION OF HIERARCHICALLY ENCAPSULATED SIGNALS

FIELD OF THE INVENTION

The present invention relates generally to data communications, and particularly to methods and systems for communication of hierarchically encapsulated signals with reliable clock recovery.

BACKGROUND OF THE INVENTION

Data signals communicated over a communication channel or network are often encapsulated hierarchically in frame structures. In addition to carrying data, frames typically carry extra information to handle tasks such as multiplexing multiple sources, synchronization, error correction, and rate adjustment. ITU-T Recommendation G.709/Y.1331, entitled "Interfaces for the Optical Transport Network (OTN)," February, 2012, which is incorporated herein by reference, describes means of communicating data over an optical network. The recommendation provides specifications for data signal structures and encapsulation schemes thereof.

SUMMARY OF THE INVENTION

An embodiment of the present invention provides an apparatus, including a data flow circuit and a clock recovery circuit. The data flow circuit is configured to extract client data, which is encapsulated in an inner frame that is encapsulated in at least an outer frame, and to output the extracted client data in accordance with a client clock signal. The clock recovery circuit includes a first clock recovery module that is configured to recover a first clock signal that matches payload data in the outer frame, and a second clock recovery module that is configured to derive from the first clock signal a second clock signal that matches the client data in the inner frame, and to produce the client clock signal from the second clock signal, for use by the data flow circuit.

In some embodiments, each of the first and second clock recovery modules is configured to accept a respective input sequence of clock pulses, and to produce the first or second clock signal by generating a gapped sequence that includes locations each filled with either a clock pulse of the respective input sequence or a gap. In other embodiments, each of the first and second clock recovery modules is configured to reduce an average clock rate of the respective input sequence by a factor equal to a ratio between a total number of the locations of the gapped sequence and a number of the clock pulses filled in the gapped sequence. In yet other embodiments, the number of the filled clock pulses in the gapped sequence of the first clock recovery module and the number of the locations in the gapped sequence of the second clock recovery module are both equal to the payload data size in the outer frame.

In an embodiment, the clock recovery circuit includes a frame synchronizer/decoder unit, which is configured to extract the number of the clock pulses to be filled in the gapped sequence of the second clock recovery module from the outer frame. In another embodiment, the clock recovery circuit is configured to derive the number of the locations in the gapped sequence of the first clock recovery module from a signal that indicates instances in which the outer frame carries the payload data. In yet another embodiment, the clock recovery circuit is configured to derive the number of the locations in the gapped sequence of the first clock recovery module and the number of the clock pulses to be filled in the gapped sequence of the second clock recovery module using a signal that indicates boundaries of the inner frame.

There is additionally provided, in accordance with an embodiment of the present invention a method including, in a data communications system, extracting client data, which is encapsulated in an inner frame that is encapsulated in at least an outer frame, recovering a first clock signal that matches a payload data in the outer frame, deriving from the first clock signal a second clock signal that matches the client data in the inner frame, producing a client clock signal from the second clock signal, and outputting the extracted client data in accordance with the client clock signal.

There is additionally provided, in accordance with an embodiment of the present invention an apparatus for data communication, including a network interface module, a cross connect matrix, and a client interface module. The network interface module is configured to receive, from a network, client signals encapsulated in inner frames that are encapsulated at least in outer frames, and to extract the inner frames from the outer frames. The cross connect matrix, is configured to route an inner frame that was extracted by the network interface module from an outer frame, and the client interface module is configured to extract client data from the inner frame, to recover a first clock signal that matches a payload data in the outer frame, to derive from the first clock signal a second clock signal that matches the client data in the inner frame, to produce a client clock signal from the second clock signal, and to output the extracted client data in accordance with the client clock signal.

The present invention will be more fully understood from the following detailed description of the embodiments thereof, taken together with the drawings in which:

DETAILED DESCRIPTION OF EMBODIMENTS

Overview

In a typical data communication system, a data sender accepts input data at a client data rate to be delivered to a destination receiver. The sender and receiver typically comprise separate local clock generator circuits that are often based on crystal oscillators. The sender and receiver clock rates are typically not precisely matched, due to factors such as crystal precision and temperature deviations. The receiver, therefore, typically comprises a clock recovery circuit that adaptively synchronizes to the sender clock. Additionally, the recovered clock rate should match the client data rate of the sender side.

Embodiments of the present invention that are described herein provide improved methods and systems for reliable clock recovery. In an embodiment, a client interface module accepts client data that is encapsulated in an inner frame that is further encapsulated in at least an outer frame. Multi-stage encapsulation of this sort is used, for example, in OTN, as will be shown below. The client interface module recovers a clock signal matched to the client data rate using a tandem of at least two clock recovery modules and a PLL device. In some embodiments the clock recovery modules implement uniform clock distribution schemes according to a general mapping procedure (GMP), also referred to as sigma-delta mapping. In the description that follows, the clock recovery modules comprise sigma-delta modules.

In an embodiment, the first sigma-delta module outputs a clock signal comprising a gapped sequence comprising clock pulses, among which multiple short-length gaps are uniformly distributed, so that the average clock rate equals a measured fraction of the receiver clock rate. The gapped sequence locations to be filled with either a clock pulse or a gap are determined by the sigma-delta mapping. The second sigma-delta module accepts the output of the first sigma-delta module and outputs a clock signal whose average rate matches the client data rate, by incorporating among the clock pulses multiple uniformly distributed gaps based on auxiliary information extracted by a frame synchronizer/decoder. A PLL device locks on the output of the second sigma-delta module to generate a client data rate uniform clock signal that serves to read data bytes previously extracted from the encapsulated input data and stored in a FIFO memory. The data read from the FIFO is output to the client, synchronized to the PLL output clock.

In another embodiment, a frame alignment signal (FAS) is additionally accepted as input to the client interface module. The availability of a frame synchronization signal simplifies both the frame synchronizer/decoder circuit that is now required to perform only the decoding part, and a circuit that controls the operation of the first sigma-delta module.

Using a tandem of two sigma-delta modules enables to reliably recover a clock signal to be input to a PLL device, whose rate is matched to the client data rate, by incorporating among the clock pulses a suitable number of uniformly distributed short-length gaps. Since long gaps are eliminated from the PLL input, the PLL device may be configured to a smaller lock range. Additionally, the probability of the PLL losing track of the client rate is reduced.

Additionally, in high-speed communication systems that cross connect a large number of high-rate signals, the disclosed techniques are advantageous as they enable to reduce the number of signals routed through the device's cross-connect matrix.

System Description

In the description that follows, embodiments of the present invention relate mainly to optical transport networks (OTN). ITU-T Recommendation G.709, cited above, provides specifications for OTN. It will be appreciated, however, that the exemplary usage of OTN is purely for the sake of description clarity, and that the present invention is applicable to any other suitable communication systems or environments.

Figure 1:
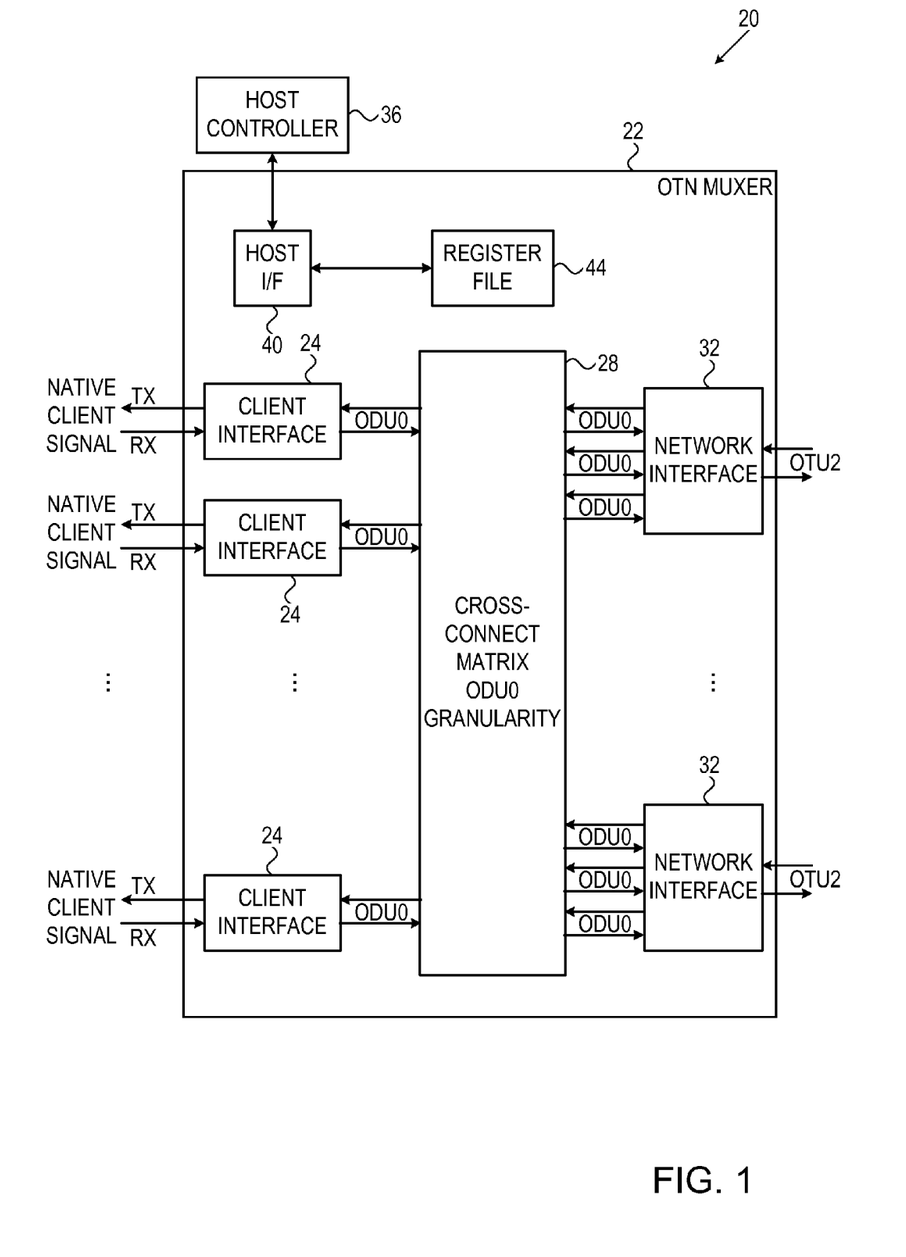
FIG. 1 is a block diagram that schematically illustrates a communication multiplexer, in accordance with an embodiment of the present invention.

FIG. 1 is a block diagram that schematically illustrates an OTN communication multiplexer system 20, in accordance with an embodiment of the present invention. System 20 comprises an OTN multiplexer 22 that bridges between multiple inputs of client devices (on the left side) and an optical network (on the right side). Multiplexer 22 accepts multiple native client data signals from the client devices, encapsulates the client data in high rate hierarchical structure frames, and delivers the frames to the optical network. Encapsulated data signals that are sent over the network arrive at multiplexer 22 to be de-encapsulated and routed to respective client destinations. In an example embodiment, multiplexer 22 interconnects between thirty-two client sources and four network ports. In alternative embodiments, however, any other suitable number of clients and network ports, as well as interconnection scheme, may be used.

Multiplexer 22 comprises one or more client interface modules 24. Each client interface supports transmission (TX) and reception (RX) of data signals. In the description that follows, RX direction refers to the delivery of data from clients towards the network, whereas TX direction refers to the delivery of data from the network towards the clients.

In OTN, data may be encapsulated in hierarchy of structures or frames. Often, signals are classified by their respective data rates. A low rate signal is also referred to as a low order or low granularity signal. Low order signals may be encapsulated in structures of higher order signals. For example, in OTN, ODU0 is a low order signal that encapsulates client data. ODU0 may be further encapsulated in a higher order signal such as OTU2. Applications that transport Ethernet signals, such as mobile backhaul and passive optical networks (PON), typically make use of interconnects based on ODU0 granularity. Signal structures and encapsulation schemes in OTN are described further below in FIG. 2. Further details are available in ITU-T Recommendation G.709/Y.1331, cited above.

In the RX direction, client interface 24 accepts native input client data (i.e., net client data without any framing/encapsulation). The number of client bits accepted (or delivered) per second is referred to as the client data rate or just the client rate. Examples for client inputs comprise STM-N, ATM, Ethernet, video serial digital interface (SDI), Fibre Channel (FC) and common public radio interface (CPRI), but any other suitable client protocols can be used.

In the RX direction, client interface 24 encapsulates client data in ODU0 frames, and delivers the ODU0 frames to a cross connect matrix 28. In the TX direction, the client interface accepts ODU0 signals that encapsulate client data from cross-connect matrix 28 and delivers net client data bytes or bits to the client. For de-encapsulating and delivery of the client data, the client interface should reliably recover a clock signal whose rate matches the client data rate (of the sender side).

Cross connect matrix 28 bridges between the client interface modules and one or more network interface modules 32. In the RX direction, Matrix 28 accepts individual ODU0 signals from multiple client interface modules 24. Based on a predefined configuration, the cross connect matrix directs each ODU0 signal to a network interface 32. In the TX direction, matrix 28 accepts ODU0 signals from network interface modules 32, and directs the ODU0 signals to respective client interfaces 24 based on a predefined configuration.

In the RX direction, network interface 32 accepts multiple ODU0 signals from matrix 28, and encapsulates, possibly with time interleaving, the multiple ODU0 signals into a high rate OTU2 signal. In the TX direction, network interface 32 de-encapsulates multiple ODU0 signals from the accepted OTU2 signal, and delivers the ODU0 signals to matrix 28.

OTN multiplexer 22 communicates with a host controller 36 via a host interface 40. The host controller configures multiplexer 22 by sending configuration parameters for storage in a register file 44. The configuration parameters control the operational modes of client interface modules 24, cross connect matrix 28, and network interface modules 32. For example, one set of parameters stored in the register file controls the interconnections of matrix 28. As another example, an additional parameter set controls encapsulation modes in the network interface modules. In addition, host controller 36 assists in debugging and monitoring of the multiplexer operation in order to handle errors and failure events.

In the example of FIG. 1, client signals are encapsulated in ODU0 signals that are further encapsulated in OTU2 signals. In terms of encapsulation hierarchy, ODU0 in this example is referred to as an inner frame and OTU2 is referred to as an outer frame. In alternative embodiments, however, any other OTN signals may be used. For example, client signals may be encapsulated in ODU1 signals (inner frames) that may be further encapsulated in ODU4 signals (outer frames). Mixed combinations are also applicable. For example, for inner frame encapsulation, some client signals may be encapsulated in ODU0 signals whereas other client signals may be encapsulated in ODU1 signals. In yet other embodiments, any other suitable signal configurations and encapsulation schemes can also be used.

The configuration of OTN multiplexer 22 in FIG. 1 is an example configuration, which is chosen purely for the sake of conceptual clarity. In alternative embodiments, any other suitable configuration can also be used. The different elements of multiplexer 22 such as modules 24, 28, and 32 may be implemented using any suitable hardware, such as in an Application-Specific Integrated Circuit (ASIC) or Field-Programmable Gate Array (FPGA). In some embodiments, some elements of the multiplexer can be implemented using software, or using a combination of hardware and software elements. For example, in some embodiments, register file 44 may be replaced or combined with a microcode implementation.

Typically, host controller 36 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Data Encapsulation Schemes

Data sent over a communication channel or network is often encapsulated in structures referred to as frames. Encapsulation enables reliable communication by incorporating information to handle tasks such as multiplexing, synchronization, error correction, and data rate adjustment.

Figure 2:
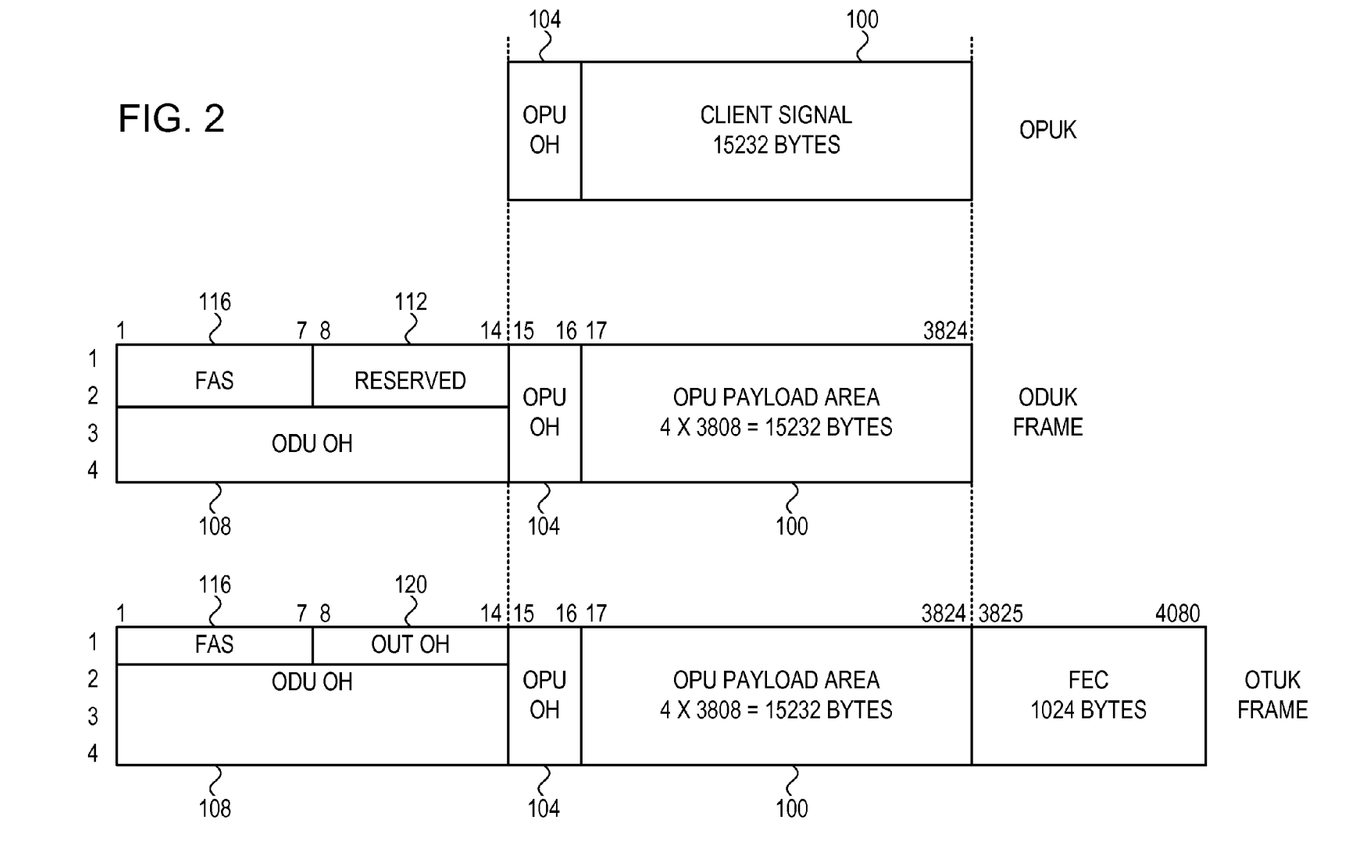
FIG. 2 is a diagram that schematically illustrates data encapsulation hierarchy, in accordance with an embodiment of the present invention.

FIG. 2 is a diagram that schematically illustrates data encapsulation hierarchy, in accordance with an embodiment of the present invention. The example of FIG. 2 refers to encapsulation schemes as defined in the ITU-T Recommendation G.709, cited above. In alternative embodiments, however, any other suitable signals and encapsulation schemes are also applicable.

FIG. 2 depicts three basic OTN information structures that respectively define the optical channel-payload unit (OPUK), data unit (ODUK), and transport unit (OTUK). The index K=0, . . . , 4 refers to corresponding signal rates as defined in tables 7-1 to 7-4 of the ITU-T Recommendation G.709. Table 1 below presents example OTN signal rates. Each row in Table 1 corresponds to one of the three basic OTN information structures. Each column refers to a basic rate that is related to respective K value. For example, the basic rate for K=2 is 9,953,280 Kbit/s. Actual signal rates are calculated as the product of a basic rate and a respective factor written in the table. For example, the nominal ODU0 rate equals 1×1,244,160 Kbit/s, whereas the nominal OTU2 rate equals 255/237×9,953,280 Kbit/s.

TABLE 1

|  | K = 0<br>1,244,160 Kbit/s | K = 1<br>2,488,320 Kbit/s | K = 2<br>9,953,280 Kbit/s |
| --- | --- | --- | --- |
| OPUK | 238/239 × | 1 × | 238/237 × |
| ODUK | 1 × | 239/238 × | 239/237 × |
| OTUK | NOT SUPPORTED | 255/238 × | 255/237 × |

In FIG. 2, an optical channel payload unit (OPUK) comprises a 15232 bytes payload area 100, and an eight-bytes payload overhead area 104. In OTN, client signal is encapsulated in OPUK frames by mapping client data into payload area 100. The ITU-T Recommendation G.709 (previously cited) specifies multiple mapping schemes according to respective client types. Constant bitrate (CBR) clients include, for example, ATM cell stream, SONET and SDH. Packet based clients include, for example, Ethernet frames. Example schemes for mapping client signals into payload area 100 are described below. Payload overhead area 104 comprises 8 bytes including a payload type indicator, and information that defines the mapping scheme of the client signal into the payload area. Information provided in overhead 104 enables a receiving end to de-encapsulate the payload area and retrieve the net client data.

As depicted in FIG. 2, an OPUK frame is encapsulated in an optical channel data unit (ODUK) frame. The ODUK structure is arranged as a byte array of four lines and 3824 columns. The ODUK frame comprises payload area 100 and payload overhead 104 of the OPUK frame. The ODUK frame further comprises an overhead part that comprises ODU OH overhead 108, a frame alignment signal (FAS) 116, and a reserved area 112. ODU overhead 108 includes information for maintenance and operational functions to support optical channels. FAS 116, enables a receiving end to synchronize on ODUK (or OTUK) frame boundaries.

ODUK frames are further encapsulated in optical channel transport unit (OTUK) frames. OTUK frames are constructed by adding to the ODUK frame 1024 forward error correction (FEC) redundancy bytes. Additionally, an OTU overhead 120 is put in place of reserved bytes 112.

In the description that follows, ODUK frames are typically referred to inner frames that are encapsulated in OTUK frames also referred to as outer frames.

Mapping and Multiplexing Schemes

As described above, client signals and OTN frames are generated using separate clock signals. Let $f_{client}$ denote the client data rate and $f_{server}$ denote the clock rate used for data encapsulation, also referred to as the server rate (data and clock rates are given herein in bits/sec). Further assume that the time duration of an encapsulated frame (or multi-frame) that comprises $B_{server}$ bytes equals $T_{server}$ seconds. As an example, in FIG. 2, $B_{server}$=15232+8=1540 bytes for the OPUK frame and $B_{server}$=3824×4=15696 bytes for the ODUK frame. The number of n-bit data units encapsulated in a frame is denoted $C_n$ and is given by:

$$C_n = \frac{f_{client} \times T_{server}}{n} = \frac{f_{client}}{f_{server}} \times \frac{8 \times B_{server}}{n}$$

Equivalently, by sending n×Cn bits in an encapsulated frame that comprises 8×$B_{server}$ bits, the client rate may be represented by:

$$f_{client} = \frac{n \times C_n}{T_{server}} = \frac{n \times C_n \times f_{server}}{8 \times B_{server}}$$

The ITU-T Recommendation G.709 allows limited rate tolerance for the client and server rates. By adjusting the number of encapsulated data bits, i.e., $n \times C_n$, in payload area 100, it is possible to accommodate limited mismatch between the client and the server rates.

Let $P_{server}$ denote the maximal number of n-bits data units that may be encapsulated in payload area 100, i.e., $C_n \le P_{server}$. A Mapping scheme thus allocates $n \times C_n$ bits of the payload area to client data, and fills the rest of the payload area with dummy or stuff data. By adjusting the amount of stuff data, it is possible to adaptively compensate for client and server rates mismatch.

ITU-T Recommendation G.709 defines a generic mapping procedure referred to as GMP, or equivalently, sigma-delta mapping. GMP may be used for mapping a client signal into an OPUK structure as well as for mapping low order OTN structures into higher order structures. As described below, GMP is designed to uniformly distribute client and stuff data in the payload area. As described further below, GMP may be also used in adjusting a clock rate to a desired value by uniformly incorporating short-length gaps among the clock pulses.

Mapping Using GMP Procedure

Assume GMP maps a number of $C_n$ n-bit data units into a payload area having a size of $P_{server}$ n-bit units whose locations are indexed by $j=1, \ldots, P_{server}$. The procedure should decide for each location j whether to insert a data or a stuff n-bit unit.

For each location j, the procedure computes a respective value V(j), formulated by $V(j)=(j \times C_n) \mod P_{server}$. The procedure then compares V(j) to $C_n$. If $V(j) \le C_n$ a data unit is inserted in the $j^{th}$ location. Otherwise, $V(j)C_n$ and a stuff unit is inserted. The procedure typically generates a repetitive pattern wherein data and stuff units are uniformly distributed. $C_n$ determines the stuffing pattern and is sent in payload overhead 104.

As an example, consider mapping thirty-three data bytes into a 40-byte payload area. Table 2 depicts the mapping result based on the described GMP procedure. The table describes the 40-byte payload area arranged in four rows of ten bytes, wherein D denotes a data byte and S denotes a stuff byte. Indices wrap around rows, thus j=1 corresponds to the upper left byte and j=11 corresponds to the first byte of the second row. In the present example, the procedure generates a uniform pattern of four or five consecutive data bytes followed by a single stuff byte.

TABLE 2

| S | D | D | D | D | S | D | D | D | D |
|---|---|---|---|---|---|---|---|---|---|
| D | S | D | D | D | D | D | S | D | D |
| D | D | S | D | D | D | D | D | S | D |
| D | D | D | D | S | D | D | D | D | D |

In some embodiments, GMP embedded information is used to generate a clock signal with uniformly distributed short-length gaps. In such embodiments, $C_n$ clock pulses are allocated in a sequence of $P_{server} \ge C_n$ clock locations. For D locations, the procedure sets a clock pulse, whereas for S locations, the procedure sets a gap. Thus, gaps are evenly distributed among the clock pulses. The GMP or sigma-delta mapping scheme reduces an input clock rate by a factor of $C_n/P_{server}$.

In OTN, multiple low order ODUK signals may be multiplexed into a higher order signal by way of mapping into the higher OPUK structure. For example, in FIG. 1, network interface 32 multiplexes eight ODU0 signals into an OPU2 payload signal (of an OTU2 signal). Annex D of the ITU-T Recommendation G.709 (cited above) describes application of the GMP for signal mapping and multiplexing in OTN.

The OTN multiplexing procedure is performed in two steps as follows. First, the ODUj signal is mapped asynchronously into a structure referred to as optical channel data tributary unit (ODTUK.ts) using, for example, GMP. The ODTU structure comprises a payload area and an overhead area to carry GMP information (i.e., $C_e$). In ODTU2.ts, for example, the payload area comprises ts×15232 bytes. For example, the payload area in ODTU2.1 comprises 15232 bytes. Since ODUj comprises more than 15232 bytes it is mapped into more than a single ODTU2.1 structure. In the second multiplexing step, the ODTUK.ts structure is byte-synchronously mapped into the higher order OPUK.

The higher order OPUk is divided into a number of substructures referred to as tributary slots (TS) that are interleaved within the OPUk. A tributary slot comprises a part of the OPUk overhead area and a part of the OPUk payload area. As described above, bytes of ODUj frames are mapped using GMP into the ODTU payload area, and the ODTU bytes are mapped into one or more OPUk tributary slots. Information that defines the GMP mapping in each tributary slot ($C_n$ or derivatives thereof due to mapping in groups of M successive bytes of the ODUj signal) is carried in the OPUk overhead area.

Figure 3:
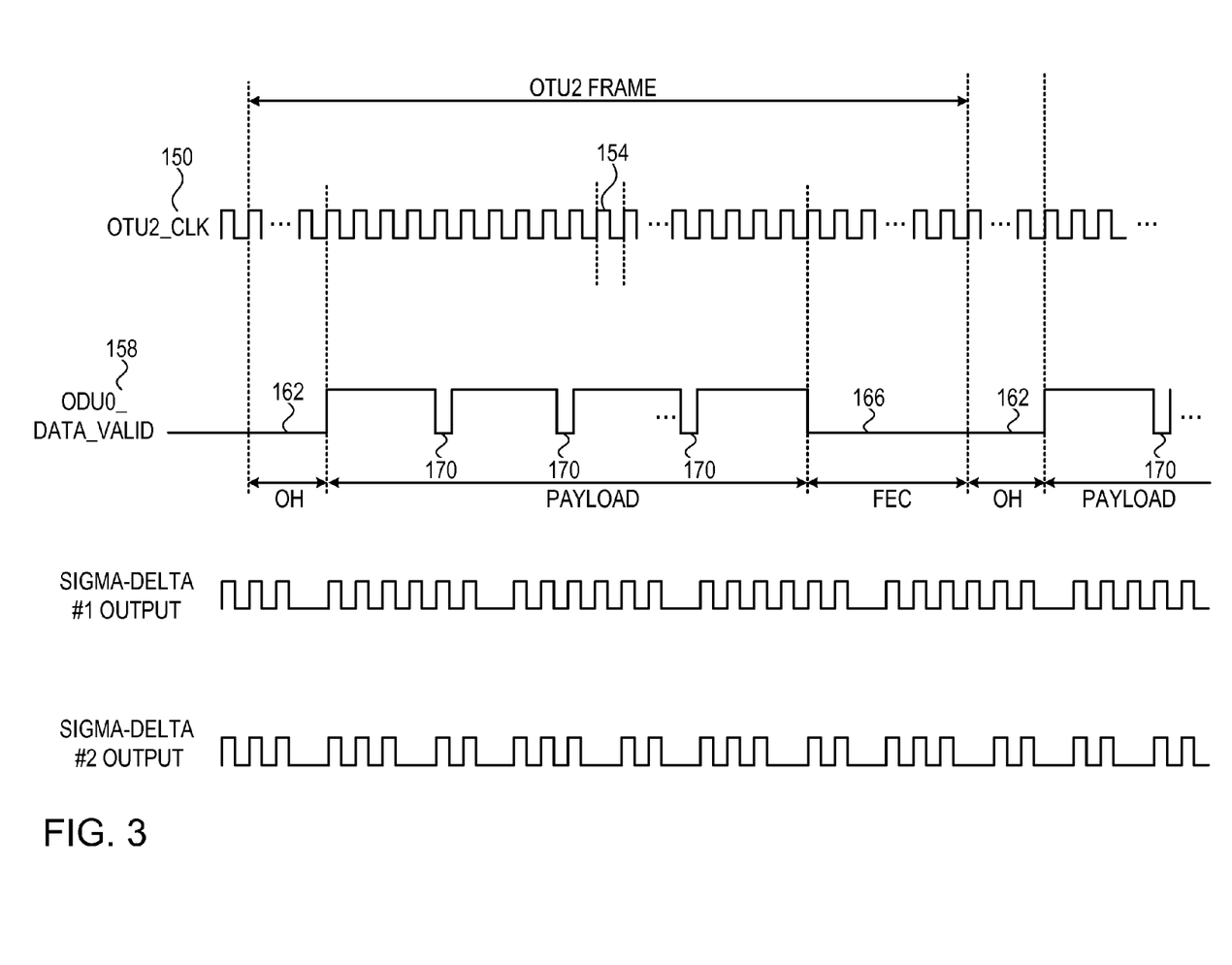
FIG. 3 is a diagram that schematically illustrates clock recovery related signals, in accordance with an embodiment of the present invention.

FIG. 3 is a diagram that schematically illustrates clock recovery related signals, in accordance with an embodiment of the present invention. OUT2 CLK denotes the high rate clock. OUT2 CLK comprises a continuous sequence of clock pulses 154. In the RX direction, network interface 32 recovers OUT2 CLK 150 and delivers it via matrix 28 to respective client interface 32.

Network interface 32 additionally de-multiplexes the OTU2 signal into multiple ODU0 signals and generates a OTU2 DATA VALID signal 158. For each ODU0 signal, the respective data valid signal 158 is active only during periods in which the payload area of OTU2 carries bytes of that ODU0 signal. As depicted in FIG. 3, data valid signal 158 is inactive during periods in which OTU2 carries overhead 162 or error correction information 166. Moreover, the data valid signal is inactive during periods 170, in which OTU2 carries tributary slots of other ODU0 signals. Other signals in FIG. 3 are described further below. To summarize, data valid signal 158 is active for each of the 15232 ODU0 bytes delivered in one tributary slot over OTU2.

Client Interface Embodiments

Figure 4:
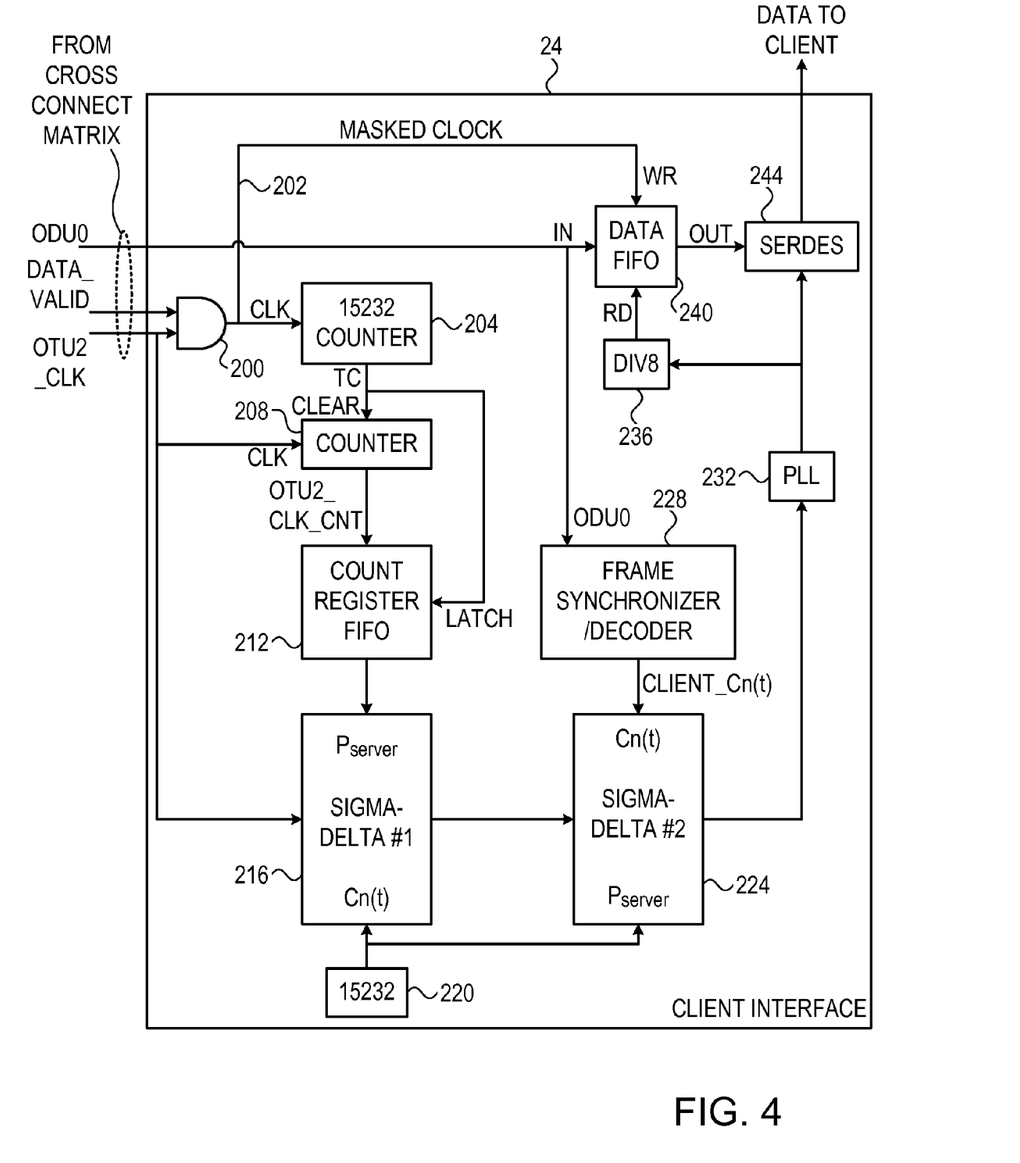
FIGS. 4 and 5 are block diagrams that schematically illustrate client interfaces, in accordance with two embodiments of the present invention.

FIG. 4 is block diagram that schematically illustrates client interface 24, in accordance with an embodiment of the present invention. In the RX direction, interface 24 accepts three signals from cross-connect matrix 28, i.e., an ODU0 signal (de-multiplexed from a OTU2 signal) plus timing signals OTU2_CLK 150 and ODU0_DATA VALID 158 as depicted in FIG. 3 above. An AND gate 200 performs a logic AND operation between clock signal 150 and data valid signal 158 to produce a masked clock signal 202.

Masked clock signal 202 comprises OUT2_CLK pulses 154 during periods in which data valid 158 is active, and is forced to zero otherwise. As a result, the masked clock signal comprises long gap periods, such as during OH 162 and FEC 166 periods shown in FIG. 2.

A counter 204 is configured to produce a terminal count (TC) pulse after counting a number of 15232 clock pulses of masked clock signal 202. A counter 208 is configured to count OUT2_CLK pulses in parallel to counter 204. The TC pulse latches the count value of counter 208, i.e., OUT2_CLK_CNT, in a count register FIFO 212, and forces counter 208 to restart counting. The average OUT2_CLK_CNT value is equal to the OTU2 frame size that carries 15232 ODU0 payload bytes. During counters 204 and 208 counting, previous stored counts in FIFO 212 are provided to a first sigma-delta module 216. FIFO 212 is typically configured to store three or four count values in order to accommodate variability in the number of ODUT2_CLK pulses that occur between successive TC pulses of counter 204. Alternatively, any other suitable number of entries in FIFO 212 may be used.

The first Sigma-delta module 216 accepts OUT2_CLK_CNT values from FIFO 212 as $P_{server}$ input, a constant value 15232 (220 in the figure) as Cn(t) input, and the OUT2_CLK signal as an input clock. Sigma-delta module 216 thus generates a sequence of OUT2_CLK_CNT locations, and uniformly allocates 15232 pulses of the OUT2_CLK clock and a complementary number of gaps among the OUT2_CLK_CNT sequence locations. The first sigma-delta module therefore outputs a gapped sequence of length OUT2_CLK_CNT, i.e., a clock signal comprising 15232 pulses among which short-length gaps are uniformly distributed. The average clock rate output by sigma-delta module 216 equals $f_{server} \times [15232/\text{average}(OUT2\_CLK\_CNT)]$, wherein $f_{server}$ equals the OUT2_CLK clock rate. An example signal of the first sigma-delta module output is depicted in FIG. 3. In FIG. 3, the signal SIGMA-DELTA #1 OUTPUT depicts a gapped sequence whose locations are filled with either clock pulses or gaps as determined by module 216.

A second sigma-delta module 224 accepts the output of first sigma-delta module 216 as an input clock signal. Additionally, sigma-delta module 224 accepts a constant 15232 value (220 in the figure) as a $P_{server}$ input, and a Cn(t) value from a frame synchronizer/decoder 228. Module 228 accepts the ODU0 input signal and synchronizes on the ODU0 frame boundaries. Additionally, module 228 decodes the frame content and extracts the Cn(t) value that was previously inserted in the overhead part by a ODU0 GMP mapper of the sender.

The second sigma-delta module evenly distributes a number of Cn(t) pulses among 15232 sequence locations. By reducing the clock rate by a factor of 15232/Cn(t), the second sigma-delta module outputs a clock signal whose average rate equals the client data rate. An example output signal, i.e., SIGMA-DELTA #2 OUTPUT, of the second sigma-delta module is depicted in FIG. 3, showing a sequence whose locations are filled with either clock pulses or gaps as determined by module 224. Typically, the gapped sequence output of module 224 comprises more gaps than the gapped sequence output of module 216 since module 224 further reduces the clock rate.

The output of sigma-delta module 224 is input to a PLL device 232 that is tuned to a multiple of the client data rate. Typically, the PLL device generates a uniform clock. Since no long gaps are present in the output of the second sigma-delta module (as opposed to masked clock signal 202) the PLL can lock and keep track of the client rate with high probability. The PLL output clock is divided by eight using a frequency divider 236.

Client interface 24 further comprises a data flow circuit that comprises a data FIFO 240 and a serializer/de-serializer (SERDES) module 244. Client data bytes of the input ODU0 signal are extracted and written into data FIFO 240, using masked clock 202 as a FIFO-write enable signal. The output of divider 236 serves to read the data FIFO at the client data rate. Data bytes output from FIFO 240 are serialized by a SERDES module 244 that is derived by the PLL output. SERDES module 244 produces a bit sequence that is transmitted to respective client.

Figure 5:
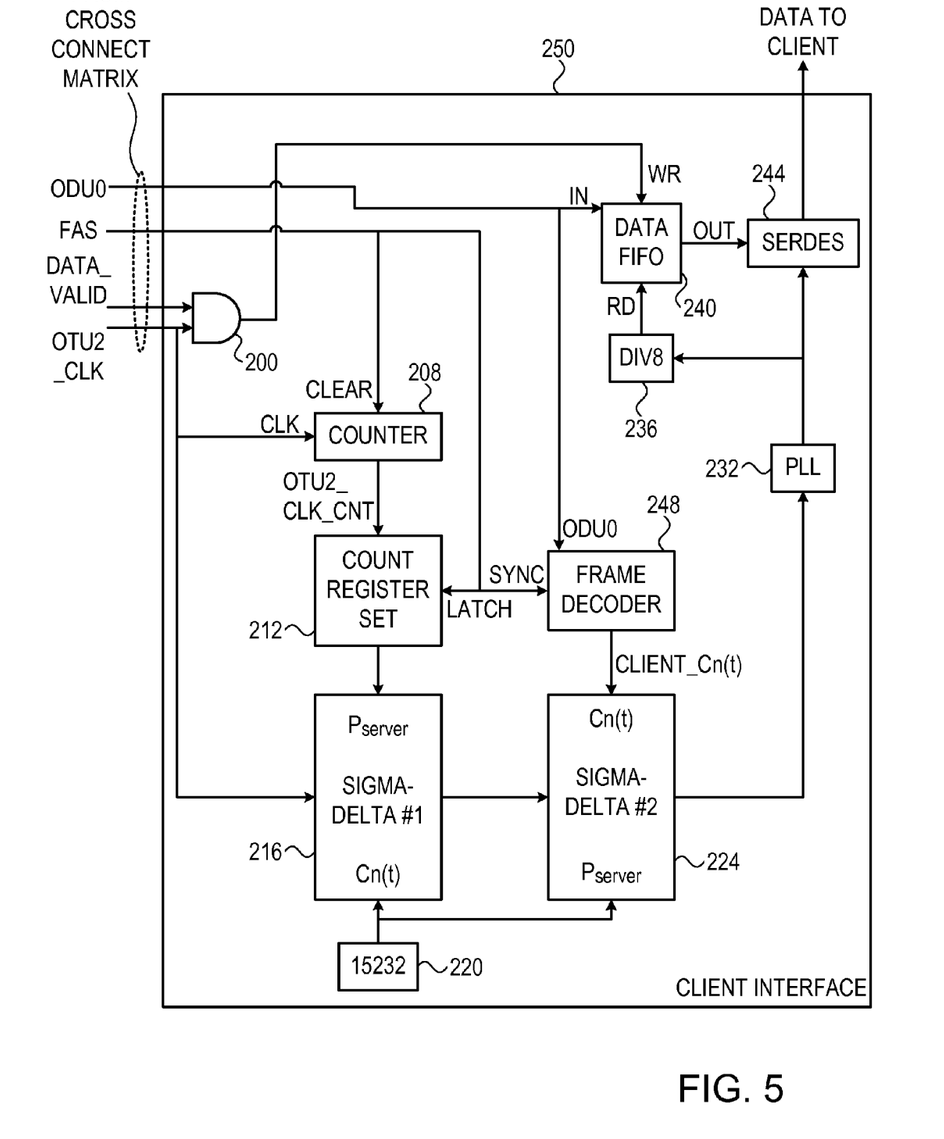

FIG. 5 is block diagram that schematically illustrates a client interface 250, in accordance with another embodiment of the present invention. Client interface 250 can be used in MUXER 22 instead of client interface 24. In the embodiment of FIG. 5, ODU0 frame synchronization is performed only at network interfaces (in FIG. 1) and not at client interfaces 250. The ODU0 frame synchronization signal (FAS) is thus generated at network interface 32 and routed via cross-connect matrix 28 to a respective client interface module. Such an architecture saves redundant implementation of a frame synchronization module in the client interfaces, at the expense of more complex routing via the cross connect matrix.

Similarly to the TC signal of counter 204 in FIG. 4, the FAS signal latches the output of counter 208, i.e., OUT2_CLK_CNT into count register FIFO 212, and then clears counter 208. Thus, in FIG. 5, FIFO 212 stores multiple OUT2_CLK_CNT values that represent the number of ODU2_CLK pulses occurring between two consecutive FAS events. Note that since ODU0 frames comprise 15232 payload bytes, OUT2_CLK_CNT>15232.

Sigma-delta module 216 uniformly distributes 15232 clock pulses of the OTU2_CLK signal among a number of OUT2_CLK_CNT sequence locations, similarly to the description of FIG. 4.

A frame decoder 248 in FIG. 5 comprises a simplified version of frame synchronizer/decoder 228 of FIG. 4. Since the FAS indicates ODU0 frame boundaries, module 248 can implement only the frame decoding task to extract Cn(t). Sigma-delta module 224 then distributes Cn(t) pulses of the clock output from the first sigma-delta module among 15232 sequence locations. Similarly to the description of FIG. 4, the average clock rate output by sigma-delta module 224 equals the client data rate.

The output of the second sigma-delta module serves as input to a PLL unit 232. Similarly to the description in FIG. 4 above, the PLL locks and keeps track of the client data rate with high probability since the input to the PLL does not comprise long gap periods. The data flow via data FIFO 240, SERDES 244 operates similarly to the description of FIG. 4 above.

The methods described above in FIGS. 4 and 5 are exemplary methods, and other suitable methods can be used in alternative embodiments. For example, mapping/distribution schemes other than sigma-delta can be used in place or in combination with sigma-delta. Additionally, the methods described herein can be readily adapted to signals and encapsulation schemes other than the ones specified for OTN. Further additionally or alternatively, in case of higher encapsulation levels, more than two sigma-delta modules (and/or other mapping schemes) can be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a data flow circuit that is configured to extract client data, which is encapsulated in an inner frame that is encapsulated in at least an outer frame, and to output the extracted client data in accordance with a client clock signal; and
a clock recovery circuit, which comprises a first clock recovery module that is configured to recover a first clock signal that matches payload data in the outer frame, and a second clock recovery module that is configured to derive from the first clock signal a second clock signal that matches the client data in the inner frame, and to produce the client clock signal from the second clock signal, for use by the data flow circuit,
wherein each of the first and second clock recovery modules is configured to accept a respective input sequence of clock pulses, to produce the first or second clock signal by generating a gapped sequence that comprises locations each filled with either a clock pulse of the respective input sequence or a gap, and to reduce an average clock rate of the respective input sequence by a factor equal to a ratio between a total number of the locations of the gapped sequence and a number of the clock pulses filled in the gapped sequence.

2. The apparatus according to claim 1, wherein the number of the filled clock pulses in the gapped sequence of the first clock recovery module and the number of the locations in the gapped sequence of the second clock recovery module are both equal to the payload data size in the outer frame.

3. The apparatus according to claim 1, wherein the clock recovery circuit comprises a frame synchronizer/decoder unit, which is configured to extract the number of the clock pulses to be filled in the gapped sequence of the second clock recovery module from the outer frame.

4. The apparatus according to claim 1, wherein the clock recovery circuit is configured to derive the number of the locations in the gapped sequence of the first clock recovery module from a signal that indicates instances wherein the outer frame carries the payload data.

5. The apparatus according to claim 1, wherein the clock recovery circuit is configured to derive the number of the locations in the gapped sequence of the first clock recovery module and the number of the clock pulses to be filled in the gapped sequence of the second clock recovery module using a signal that indicates boundaries of the inner frame.

6. A method, comprising:
in a data communications system, extracting client data, which is encapsulated in an inner frame that is encapsulated in at least an outer frame;
recovering a first clock signal that matches a payload data in the outer frame;
deriving from the first clock signal a second clock signal that matches the client data in the inner frame;
producing a client clock signal from the second clock signal; and
outputting the extracted client data in accordance with the client clock signal,
wherein recovering the first clock signal and deriving the second clock signal each comprises accepting a respective input sequence of clock pulses, generating a respective first or second gapped sequence that comprises locations each filled with either a clock pulse of the respective input sequence or a gap, and reducing an average clock rate of the respective input sequence by a factor equal to a ratio between a total number of the locations of the respective gapped sequence and a number of the clock pulses filled in the respective gapped sequence.

7. The method according to claim 6, wherein recovering the first clock signal and deriving the second clock signal comprise setting the number of the filled clock pulses in the first gapped sequence and the number of the locations in the second gapped sequence to be equal to the payload data size in the outer frame.

8. The method according to claim 6, wherein deriving the second clock signal comprises extracting the number of the clock pulses to be filled in the second gapped sequence from the outer frame.

9. The method according to claim 6, wherein recovering the first clock signal comprises deriving the number of the locations in the first gapped sequence from a signal that indicates instances wherein the outer frame carries the payload data.

10. The method according to claim 6, wherein recovering the first clock signal and deriving the second clock signal comprise deriving the number of the locations in the first gapped sequence and the number of the clock pulses to be filled in the second gapped sequence using a signal that indicates boundaries of the inner frame.

11. An apparatus for data communication, comprising:
a network interface module, which is configured to receive, from a network, client signals encapsulated in inner frames that are encapsulated at least in outer frames, and to extract the inner frames from the outer frames;
a cross connect matrix, which is configured to route an inner frame that was extracted by the network interface module from an outer frame; and
a client interface module, which is configured to extract client data from the inner frame, to recover a first clock signal that matches a payload data in the outer frame, to derive from the first clock signal a second clock signal that matches the client data in the inner frame, to produce a client clock signal from the second clock signal, and to output the extracted client data in accordance with the client clock signal,
wherein the client interface module is further configured to accept for each of the first and second clock signals a respective input sequence of clock pulses, to produce the first or second clock signal by generating a gapped sequence that comprises locations each filled with either a clock pulse of the respective input sequence or a gap, and to reduce an average clock rate of the respective input sequence by a factor equal to a ratio between a total number of the locations of the gapped sequence and a number of the clock pulses filled in the gapped sequence.

* * * * *